(12) United States Patent  
Wildhagen

(10) Patent No.: US 7,295,631 B2
(45) Date of Patent: Nov. 13, 2007

(54) STEREO DEMULTIPLEXER

(75) Inventor: Jens Wildhagen, Weinstadt (DE)

(73) Assignee: Sony Deutschland GmbH, Cologne (DE)

( * ) Notice: Subject to any disclaimer, the term of this patent is extended or adjusted under 35 U.S.C. 154(b) by 819 days.

(21) Appl. No.: 10/143,057

(22) Filed: May 10, 2002

(65) Prior Publication Data

US 2002/0168030 A1     Nov. 14, 2002

(30) Foreign Application Priority Data

May 14, 2001   (EP)   ................................. 01111695

(51) Int. Cl.
*H03K 9/00*   (2006.01)

(52) U.S. Cl. ...................... 375/316; 375/148; 375/347; 375/152; 381/4; 381/15; 455/212; 455/218

(58) Field of Classification Search ................ 375/316, 375/261, 320, 345, 344, 148, 347; 381/3, 381/4, 15; 455/212, 218
See application file for complete search history.

(56) References Cited

U.S. PATENT DOCUMENTS

| | | | |
|---|---|---|---|
| 5,222,144 A * | 6/1993 | Whikehart | 381/15 |
| 5,257,312 A * | 10/1993 | Therssen et al. | 381/4 |
| 5,404,405 A | 4/1995 | Collier et al. | 381/7 |
| 5,442,709 A | 8/1995 | Vogt et al. | 381/7 |
| 5,901,184 A * | 5/1999 | Ben-Efraim et al. | 375/344 |
| 6,456,833 B1 * | 9/2002 | Sessink | 455/212 |
| 6,480,528 B1 * | 11/2002 | Patel et al. | 375/148 |
| 6,694,026 B1 * | 2/2004 | Green | 381/3 |
| 2002/0163981 A1 * | 11/2002 | Troemel, Jr. | 375/345 |

FOREIGN PATENT DOCUMENTS

| | | |
|---|---|---|
| EP | 00 124 466.4 | 11/2000 |
| EP | 1 094 613 | 4/2001 |

* cited by examiner

*Primary Examiner*—Chieh M. Fan
*Assistant Examiner*—Eva Zheng
(74) *Attorney, Agent, or Firm*—Oblon, Spivak, McClelland, Maier & Neustadt, P.C.

(57) ABSTRACT

A stereo demultiplexer is proposed which can be calculation power efficiently implemented in a DSP. Modern digital FM receivers exploit the information content in the in quadrature component of the modulated difference signal for a noise reduction. The proposed stereo demultiplexer derives the in phase component and the in quadrature component of the difference signal with a minimized number of sinus and cosinus calculations by first downconverting the modulated difference signal to a not synchronized complex baseband signal on basis of a fixed frequency, thereafter a complex sampling rate decimation unit sampling rate decimates the not synchronized complex baseband signal with a factor N and a second complex mixer synchronizes and coherent demodulates the sampling rate decimated not synchronized baseband signal on basis of a first complex carrier signal derived on basis of the pilot carrier signal and the fixed frequency. The proposed stereo demultiplexer can easily be combined with a noise reduction system and the digital demodulation of the RDS and ARI signals.

6 Claims, 1 Drawing Sheet

STEREO DEMULTIPLEXER

BACKGROUND

1. Field of the Invention

The present invention is directed to a stereo demultiplexer, in particular to a stereo demultiplexer realizing a calculation power efficient demodulation of the in phase and in quadrature components of the stereo difference signal.

2. Description of Related Art

A calculation power efficient stereo demultiplexer was already proposed in European patent application 99 120 798.6 of the applicant which is incorporated by reference herein. This stereo demultiplexer performs a calculation power efficient demodulation of the stereo difference signal, but only the in phase component of the modulated difference signal is demodulated. Modern denoising system, as proposed for example in European patent application 00 124 466.4 of the applicant which is incorporated by reference herein, require the demodulation of the in phase component and the in quadrature component of the difference signal for a noise reduction.

Therefore, it is the object underlying the present invention to provide a calculation power efficient stereo demultiplexer and method to demultiplex a stereo multiplex signal.

BRIEF SUMMARY OF THE DISCLOSURE

The stereo demultiplexer according to the present invention is defined in independent claim 1. The method to demultiplex a stereo multiplex signal is defined in independent claim 5. Preferred embodiments thereof are respectively defined in the respective following subclaims. A computer program product according to the present invention is defined.

Therefore, a stereo demultiplexer according to the present invention receives a stereo multiplex signal which comprises at least a difference signal, and a pilot carrier signal is characterised by a first complex mixer to downconvert the modulated difference signal to a not synchronized complex baseband signal on basis of a fixed frequency, a complex sampling rate decimation unit receiving the not synchronized complex baseband signal and sampling rate decimating said signal with a factor N and a second complex mixer synchronizing and coherent demodulating the sampling rate not synchronized complex baseband signal on basis of a first complex carrier signal derived on basis of the pilot carrier signal and the fixed frequency.

Corresponding thereto the method according to the present invention to demultiplex a stereo multiplex signal which comprises at least a difference signal and a pilot carrier signal is characterised by the steps of: downconverting the modulated difference signal to a not synchronized baseband signal on basis of a fixed frequency, sampling rate decimating the not synchronized baseband signal with a factor N and synchronizing and coherent demodulating the sampling rate decimated not synchronized complex baseband signal on basis of a first complex carrier signal derived on basis of the pilot carrier signal and the fixed frequency.

Therefore, the demultiplexer and method to demultiplex a stereo multiplex signal according to the present invention minimise the number of sinus and cosinus calculations which are needed for the synchronization and coherent demodulation. The sinus/cousinus operations are performed at a reduced sampling rate. Only one sinus and one cousinus need to be calculated per sample of the reduced sampling rate.

In particular, the present invention enables to combine the power efficient demodulation of the stereo difference signal in combination with a noise reduction system, since the in phase component as well as the in quadrature component of the difference signal are synchronized and coherent demodulated. Furthermore, the digital demodulation of the RDS and ARI signals is easily combined with the stereo demultiplexer according to the present invention, since the downconversion and sampling rate decimation of the RDS and ARI carriers is done with the same sampling rate decimation filters that are used to sampling rate decimate the stereo difference signal. Since the sampling rate decimated complex baseband signal which is not synchronized can be used for the decoding of the ARI and RDS data signal, the system has the advantage that the RDS carrier synchronization loop (COSTAS loop) is not affected by the tracking of the DPLL (Digital Phase Locked Loop) circuit which is needed for synchronization and coherent demodulation so that a faster RDS synchronization can be achieved.

Therefore, when the modulated difference signal is denoted as helper signal, the stereo demultiplexer according to the present invention is preferably characterised by a DPLL receiving the pilot carrier signal and generating a first complex helper carrier signal that is locked to the second harmonic of the pilot carrier signal, and a third complex mixer to generate the first complex carrier signal receiving the first complex helper carrier signal and mixing it with a second complex helper carrier signal according to the fixed frequency and a correcting phase offset so that the synchronized complex baseband signal comprises in its in phase component the in phase component of the synchronized helper signal, i.e. the coherent demodulated difference signal, and in its in quadrature component the in quadrature component of the synchronized helper signal.

Alternatively, the DPLL can directly calculate the first complex carrier signal that is locked to the second harmonic of the pilot carrier signal and the fixed frequency and uses a correcting phase offset so that the synchronized complex baseband signal comprises in its in phase component the in phase component of the synchronized helper signal, i.e. the coherent demodulated difference signal, and in its in quadrature component the in quadrature component of the synchronized helper signal which calculation is then performed on basis of the received pilot carrier signal.

Furthermore, to demodulate the RDS and ARI signals, preferably a fourth complex mixer is provided which receives the sampling rate decimated not synchronized complex baseband signal to generate RDS and ARI signals on basis of a second complex carrier signal.

BRIEF DESCRIPTION OF THE DRAWING

The stereo demultiplexer and method to demultiplex a stereo multiplex signal which corresponds to the functional definitions given above according to the present invention, their features and advantages will become more apparent from the following detailed description of an exemplary embodiment of a stereo demultiplexer according to the present invention taken in conjunction with the accompanying FIG. 1 which shows a stereo demultiplexer according to the present invention with denoising functionality and digital demodulation of the RDS and ARI signals.

DETAILED DESCRIPTION

Figure 1:
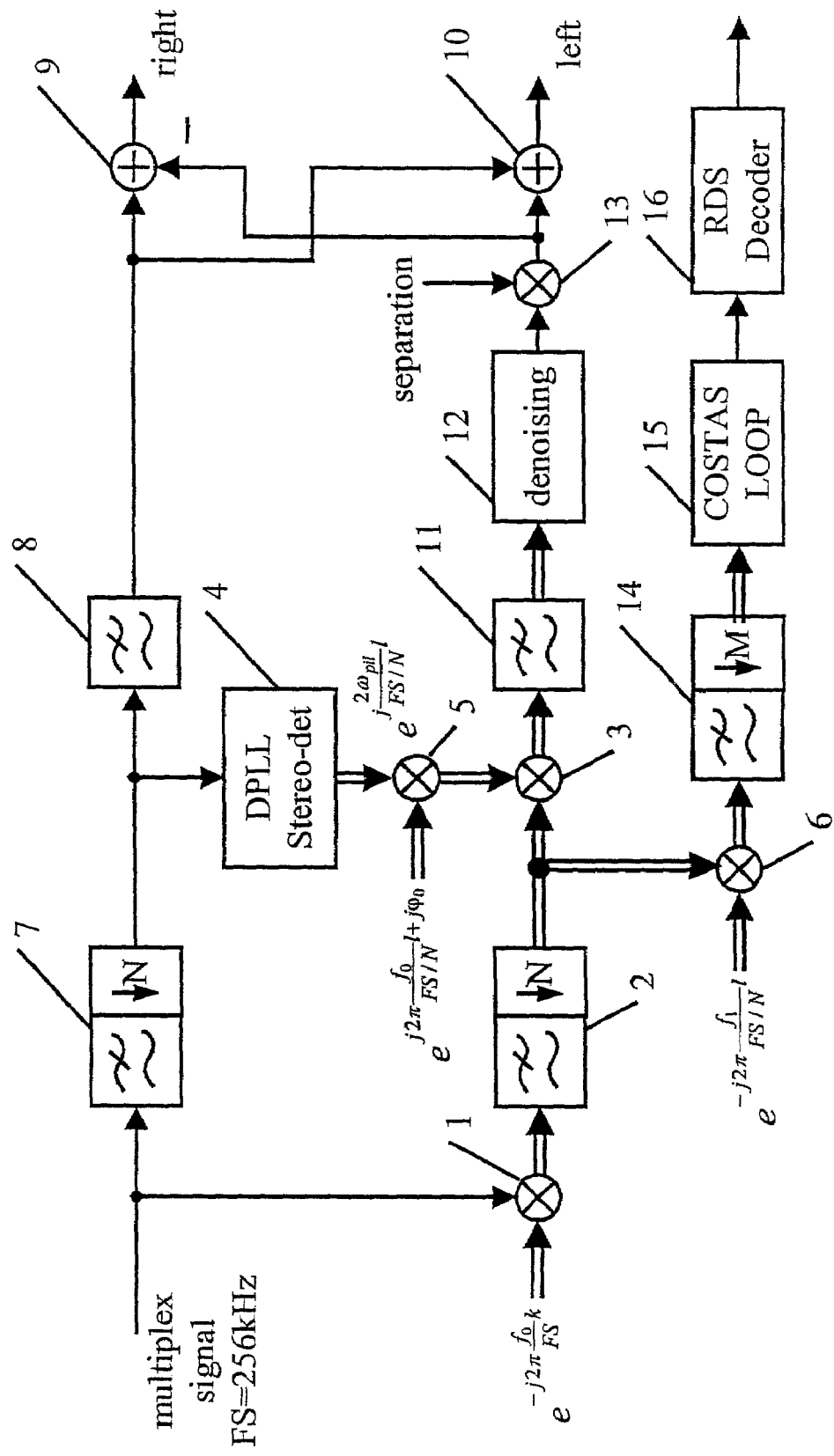

The path of the sum signal of the stereo demultiplexer according to the present invention shown in FIG. 1 is basically similar to that of the digital stereo demultiplexer disclosed in the above referenced European patent application 99 120 798.6. In the stereo demultiplexer as shown in FIG. 1 the stereo multiplex signal—in the sum signal path—is input to a first lowpass filter and sampling rate decimating unit 7 which output signal is again lowpass filtered in a first lowpass filter 8 to be thereafter input as minuent into a subtracter 9 and as summand into an adder 10. The subtracter 9 receives the processed stereo difference signal as subtrahent to output the right audio signal and the adder 10 receives the processed stereo difference signal as summand to output the left audio signal.

The stereo multiplex signal—in the difference signal path—is further input into a first mixer 1 which downconverts the modulated difference signal, i.e. the helper signal, to a not synchronized complex baseband signal on basis of a fixed frequency. The not synchronized complex baseband signal output by the first mixer 1 is input to a second lowpass filter and sampling rate decimating unit 2 which sampling rate decimates said complex signal with a factor N which is similar to the sampling rate decimation factor of the first lowpass filter and sampling rate decimation unit 7 in the sum signal path. The output signal of the second sampling rate decimation unit 2 is input to a second complex mixer 3 which synchronizes and coherent demodulates the sampling rate decimated not synchronized complex baseband signal on basis of a first complex carrier signal. The synchronized and coherent demodulated complex baseband signal, which comprises in its in phase component the in phase component of the synchronized helper signal, i.e. the coherent demodulated difference signal, and in its in quadrature component the in quadrature component of the synchronized helper signal, undergoes a lowpass filtering in a second lowpass filter 11 before a denoising unit 12 which requires the in phase and in quadrature components performs a denoising and the in phase component is separated by a mixer 13 on basis of a separation signal to generate the processed stereo difference signal which is input to the subtracter 9 and the adder 10 as described above.

The first complex carrier signal is generated by a DPLL (Digital Phase Locked Loop) circuit 4 which receives the pilot carrier from the output signal of the lowpass filter and sampling decimation unit 7 in the sum signal path and generates a first complex helper carrier signal that is locked to the second harmonic of the pilot carrier. This first complex helper carrier signal is input to a third complex mixer 5 to be adapted to the fixed frequency and a correcting phase offset to synchronize the baseband difference signal. The third complex mixer 5 outputs the first complex carrier signal.

The output signal of the second lowpass filter and sampling rate decimation unit 2 is further input to a fourth complex mixer 6 to be modulated with a second complex carrier signal. The output signal of the fourth complex mixer 6 is input to a third complex lowpass filter and sampling rate decimation unit 14 decimating said signal with a decimation factor M whereafter a COSTAS loop 15 performs a synchronization on said signal so that a following RDS decoder 16 can generate RDS and ARI signals.

In the following the functionality of the RDS demultiplexer shown in FIG. 1 will be described, wherein the modulated difference signal is again denoted as helper signal.

The helper signal is downconverted to a complex baseband signal by mixing the helper signal with a complex carrier $e^{-j2\pi(f_o/(FS))k}$, i.e. with a complex carrier having a fixed frequency, in the first mixer 1. The frequency of this first mixer is fixed, therefore the sinus and cosinus values of the mixer can be stored in a very small table (in the example below a table with 20 entries for $f_o=38.4$ kHz).

The downconverted complex helper signal output by the first mixer 1 is filtered and sampling rate decimated with a factor N in the second lowpass filter and sampling rate decimation unit 2. The so generated sampling rate decimated baseband signal is not synchronized to the second harmonic of the pilot carrier. Therefore, to generate in phase and in quadrature components of the difference signal, the synchronization/coherent demodulation of the baseband signal is performed by a second complex mixer 3 which mixes the not synchronized helper baseband signal with a complex carrier, i. e. the first complex carrier signal, that is generated from the DPLL circuit 4. In the elucidated example, as shown in FIG. 1, the DPLL circuit 4 outputs the complex 38 kHz carrier $e^{j(2\omega_{pil}/(FS/N))1}$, i.e. the first complex helper carrier signal, that is locked to the second harmonic of the pilot carier. This first complex helper carrier signal is mixed with a second complex carrier helper signal $e^{j2\pi(f_o/(FS/N))1+j\phi_o}$, to calculate the first complex carrier signal that is required to synchronize and coherent demodulate the baseband helper signal. With the correct setting of a correcting phase offset $\phi_o$, the in phase component helper baseband signal contains the coherent demodulated difference signal and the in quadrature component contains the coherent demodulated in quadrature component of the helper signal. The first complex carrier $e^{j(2\omega_{pil}/(FS/N))1+j2\pi(f_o/(FS/N))1+j\phi_o}$ can either be generated in the DPLL circuit 4 directly (not shown) or, as it is proposed for the circuit shown in FIG. 1, by using the in phase and the in quadrature component $e^{j(2\omega_{pil}/(FS/N))1}$ of the second harmonic of the pilot carrier.

The second harmonic of the pilot carrier can be calculated very simple from the in phase and in quadrature components of the pilot carrier using trigonometric transformations without additional sinus and cosinus operations. The in phase and in quadrature components of the pilot carrier are required in the DPLL circuit 4 anyway, so that the demodulation of the difference signal can be performed without additional sinus and cosinus operations. Alternatively, one complex mixer can be avoided and the first complex carrier $e^{j(2\omega_{pil}/(FS/N))1+j2\pi(f_o/(FS/N))1+j\phi_o}$ can be calculated directly in the DPLL circuit 4.

The RDS and ARI signals can very simple be generated from the complex decimation filter output signal by mixing the baseband difference signal with a complex carrier $e^{-j2\pi(f_1/(FS/N))1}$. So the sampling rate decimation filter and the mixer of the difference signal path can be used for the decoding of the ARI and RDS data signals. This system has the advantage compared to the above-mentioned patent application, that the RDS carrier synchronization loop (COSTAS loop) is not affected by the tracking of the DPLL circuit 4. Therefore, a faster RDS synchronization can be achieved.

The main advantages between the invention and the state of the art are that the digital demultiplexer has a low calculation power consumption, the coherent demodulation of in phase and in quadrature components of the difference signal is performed without additional sinus and cosinus operations. Only one sinus and one cosinus operation is required per sample of the decimated sampling rate. Further, the decimation filters of the difference signals can be used for the sampling rate decimation of the RDS signal in combination with avoiding any influence from the DPLL circuit 4 to the RDS carrrier recovery loop, and the DPLL circuit 4 as well as the whole difference signal demodulation works at a reduced sampling rate.

I claim

1. A stereo demultiplexer receiving a stereo multiplex signal which comprises at least a modulated difference signal and a pilot carrier signal, the demultiplexer comprising:
   a first complex mixer to downconvert a helper signal which equals to the modulated difference signal, to a not synchronized complex baseband signal on basis of a fixed frequency;
   a complex sampling rate decimation unit receiving the not synchronized complex baseband signal and sampling rate decimating said complex baseband signal with a factor N where N is a real number; and
   a second complex mixer synchronizing and coherent demodulating the sampling rate decimated not synchronized complex baseband signal on basis of a first complex carrier signal derived on basis of the pilot carrier signal and the fixed frequency,
   wherein a DPLL receiving the pilot carrier signal and generating a first complex helper carrier signal that is locked to the second harmonic of the pilot carrier signal, and
   a third complex mixer to generate the first complex carrier signal receiving the first complex helper carrier signal and mixing it with a second complex helper carrier signal according to the fixed frequency and a correcting phase offset so that the synchronized complex baseband signal comprises, in its in phase component, the in phase component of the synchronized helper signal, and in its in quadrature component, the in quadrature component of the synchronized helper signal.

2. A stereo demultiplexer receiving a stereo multiplex signal which comprises at least a modulated difference signal and a pilot carrier signal, the demultiplexer comprising:
   a first complex mixer to downconvert a helper signal which equals to the modulated difference signal, to a not synchronized complex baseband signal on basis of a fixed frequency;
   a complex sampling rate decimation unit receiving the not synchronized complex baseband signal and sampling rate decimating said complex baseband signal with a factor N where N is a real number; and
   a second complex mixer synchronizing and coherent demodulating the sampling rate decimated not synchronized complex baseband signal on basis of a first complex carrier signal derived on basis of the pilot carrier signal and the fixed frequency,
   wherein a DPLL receiving the pilot carrier signal and generating said first complex carrier signal that is locked to the second harmonic of the pilot carrier signal and the fixed frequency and induces a correcting phase offset so that the synchronized complex baseband signal comprises, in its in phase component, the in phase component of the synchronized helper signal, and in its in quadrature component, the in quadrature component of the synchronized helper signal.

3. A stereo demultiplexer receiving a stereo multiplex signal which comprises at least a modulated difference signal and a pilot carrier signal, the demultiplexer comprising:
   a first complex mixer to downconvert a helper signal which equals to the modulated difference signal, to a not synchronized complex baseband signal on basis of a fixed frequency;
   a complex sampling rate decimation unit receiving the not synchronized complex baseband signal and sampling rate decimating said complex baseband signal with a factor N where N is a real number; and
   a second complex mixer synchronizing and coherent demodulating the sampling rate decimated not synchronized complex baseband signal on basis of a first complex carrier signal derived on basis of the pilot carrier signal and the fixed frequency,
   wherein a third complex mixer receiving the sampling rate decimated not synchronized complex baseband signal to generate Radio Data System and Automobile Driver's Radio Broadcast Information System signals on basis of a second complex carrier signal.

4. A method to demultiplexer a stereo multiplex signal which comprises at least a modulated difference signal and a pilot carrier signal, comprising the steps of:
   downconverting a helper signal which equals to the modulated difference signal, to a not synchronized complex baseband signal on basis of a fixed frequency,
   sampling rate decimating the not synchronized complex baseband signal with a factor N where N is a real number,
   synchronizing and coherent demodulating the sampling rate decimated not synchronized complex baseband signal on basis of a first complex carrier signal derived on basis of the pilot carrier signal and the fixed frequency,
   generating a first complex helper carrier signal that is locked to the second harmonic of the pilot carrier signal, and
   generating the first complex carrier signal on basis of the first complex helper carrier signal and a second complex helper carrier signal according to the fixed frequency and a correcting phase offset so that the synchronized complex baseband signal comprises, in its in phase component, the in phase component of the synchronized helper signal, and in its in quadrature component, the in quadrature component of the synchronized helper signal.

5. A method to demultiplexer a stereo multiplex signal which comprises at least a modulated difference signal and a pilot carrier signal, comprising the steps of:
   downconverting a helper signal which equals to the modulated difference signal, to a not synchronized complex baseband signal on basis of a fixed frequency,
   sampling rate decimating the not synchronized complex baseband signal with a factor N where N is a real number,
   synchronizing and coherent demodulating the sampling rate decimated not synchronized complex baseband signal on basis of a first complex carrier signal derived on basis of the pilot carrier signal and the fixed frequency, and
   generating said first complex carrier signal that is locked to the second harmonic of the pilot carrier signal and the fixed frequency and induces a correcting phase offset so that the synchronized complex baseband signal comprises, in its in phase component, the in phase component of the synchronized helper signal, and in its in quadrature component, the in quadrature component of the synchronized helper signal.

6. A method to demultiplexer a stereo multiplex signal which comprises at least a modulated difference signal and a pilot carrier signal, comprising the steps of:

downconverting a helper signal which equals to the modulated difference signal, to a not synchronized complex baseband signal on basis of a fixed frequency, sampling rate decimating the not synchronized complex baseband signal with a factor N where N is a real number, synchronizing and coherent demodulating the sampling rate decimated not synchronized complex baseband signal on basis of a first complex carrier signal derived on basis of the pilot carrier signal and the fixed frequency, and generating Radio Data System and Automobile Driver's Radio Broadcast Information System signals on basis of a second complex carrier signal and the sampling rate decimated not synchronized complex baseband signal.

\* \* \* \* \*